United States Patent
Sato

(10) Patent No.: US 12,542,995 B2
(45) Date of Patent: Feb. 3, 2026

(54) SOUND COLLECTION SETTING METHOD AND SOUND COLLECTION APPARATUS

(71) Applicant: YAMAHA CORPORATION, Hamamatsu (JP)

(72) Inventor: Koichiro Sato, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 214 days.

(21) Appl. No.: 18/366,058

(22) Filed: Aug. 7, 2023

(65) Prior Publication Data

US 2024/0073593 A1 Feb. 29, 2024

(30) Foreign Application Priority Data

Aug. 26, 2022 (JP) .................. 2022-134669

(51) Int. Cl.
*H04R 3/00* (2006.01)
*G06T 7/70* (2017.01)
*H04R 1/32* (2006.01)

(52) U.S. Cl.
CPC ............... *H04R 1/326* (2013.01); *G06T 7/70* (2017.01); *G06T 2207/20081* (2013.01)

(58) Field of Classification Search
CPC .. H04R 1/326; G06T 2207/20081; G06T 7/70
USPC .................................. 381/92, 122
See application file for complete search history.

(56) References Cited

U.S. PATENT DOCUMENTS

| | | |
|---|---|---|
| 2017/0034474 A1 | 2/2017 | Goto et al. |
| 2021/0099796 A1 | 4/2021 | Usami et al. |
| 2021/0209787 A1 | 7/2021 | Kim et al. |
| 2021/0400204 A1* | 12/2021 | Kasugai ............... H04N 23/611 |
| 2022/0101854 A1* | 3/2022 | Gallagher .............. H04R 1/406 |
| 2022/0116729 A1 | 4/2022 | Ukai et al. |

FOREIGN PATENT DOCUMENTS

JP 2017028608 A 2/2017

OTHER PUBLICATIONS

Extended European Search Report issued in European Appln. No. 23193181.7, mailed Jan. 22, 2024.
Office Action issued in European Appln. No. 23193181.7 mailed on Nov. 13, 2025.

* cited by examiner

*Primary Examiner* — Ammar T Hamid
(74) *Attorney, Agent, or Firm* — ROSSI, KIMMS & McDOWELL LLP

(57) ABSTRACT

A sound collection setting method detects a specific object from an image captured by a camera, obtains position information of the specific object in the image, and sets a sound collection target range of a microphone by changing directivity of the microphone, based on the position information.

16 Claims, 15 Drawing Sheets

SOUND COLLECTION SETTING METHOD AND SOUND COLLECTION APPARATUS

CROSS REFERENCE TO RELATED APPLICATIONS

This Nonprovisional application claims priority under 35 U.S.C. § 119(a) on Patent Application No. 2022-134669 filed in Japan on Aug. 26, 2022, the entire contents of which are hereby incorporated by reference.

BACKGROUND

Technical Field

An embodiment of the present disclosure relates to a sound collection setting method and a sound collection apparatus.

Background Information

Japanese Unexamined Patent Application Publication No. 2017-28608 discloses a video conference terminal device including an image imaging unit that captures a video image of a speaker, a sound collection unit that collects speech of the speaker and detects an arrival direction of the speech, and a collection sound range set unit that sets a collection sound range in which the sound collection unit performs sound collection, to a predetermined range including the arrival direction, and a field angle set unit that sets a field angle to capture the video image so as to fit to the collection sound range to be set by the collection sound range set unit.

The video conference terminal device of Japanese Unexamined Patent Application Publication No. 2017-28608 matches a sound collection range with a range of a camera image. With the configuration of Japanese Unexamined Patent Application Publication No. 2017-28608, the range of a camera image is set by the speech, and, when a speaker other than a participant is present, the speaker is also recognized as a participant. In short, with the configuration of Japanese Unexamined Patent Application Publication No. 2017-28608, a user cannot optionally set the sound collection target range nor recognize the sound collection target range.

SUMMARY

An embodiment of the present disclosure is directed to provide a sound collection setting method to enable a user to easily set a sound collection target range and to recognize the sound collection target range.

A sound collection setting method according to an embodiment of the present disclosure detects a specific object from an image captured by a camera, obtains position information of the specific object in the image, and sets a sound collection target range of a microphone with changeable directivity, based on the position information.

According to an embodiment of the present disclosure, a user can easily set a sound collection target range and can recognize the sound collection target range.

DETAILED DESCRIPTION

Figure 1:
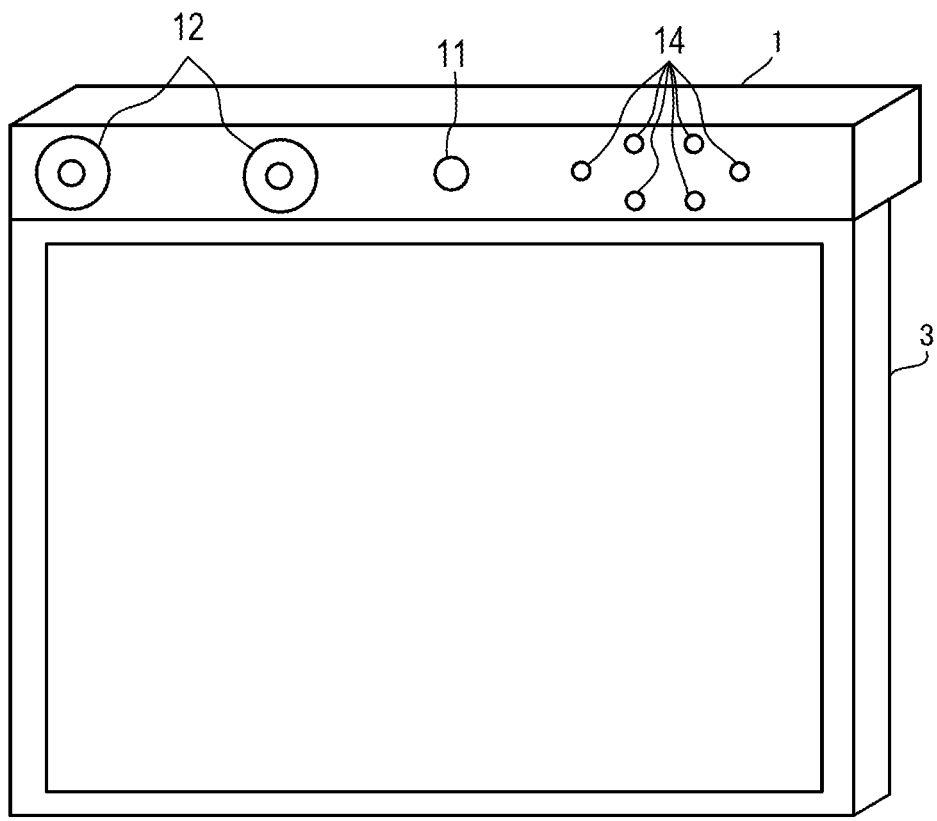
FIG. 1 is an external perspective view of a sound collection apparatus 1 and a display 3.

FIG. 1 is an external perspective view of a sound collection apparatus 1 and a display 3. The sound collection apparatus 1 includes a housing with a rectangular parallelepiped shape that is long in a width direction. The housing of the sound collection apparatus 1 is placed on the top surface of the display 3 as an example. The sound collection apparatus 1 includes a camera 11, a plurality of speakers 12, and a plurality of microphones 14, on a front of the housing. The camera 11, the plurality of speakers 12, and the plurality of microphones 14 are placed side by side in the width direction on the front of the housing. In this example, the camera 11 is placed in a center of the front of the housing. The plurality of speakers 12 are placed on a left side of the front of the housing. The plurality of microphones 14 are placed on a right side of the front of the housing.

It is to be noted that the number of speakers 12, although being two in this example, may be one or more. In addition, the plurality of speakers 12 are not essential in the present disclosure. In addition, in this example, the number of microphones is six. The plurality of microphones 14 function as microphones of which directivity can be changed by beamforming to be described below. When the number of microphones 14 is at least two or more, the directivity can be changed by the beamforming. In addition, even one microphone may function as a microphone with changeable directivity by physically changing a direction.

Figure 2:
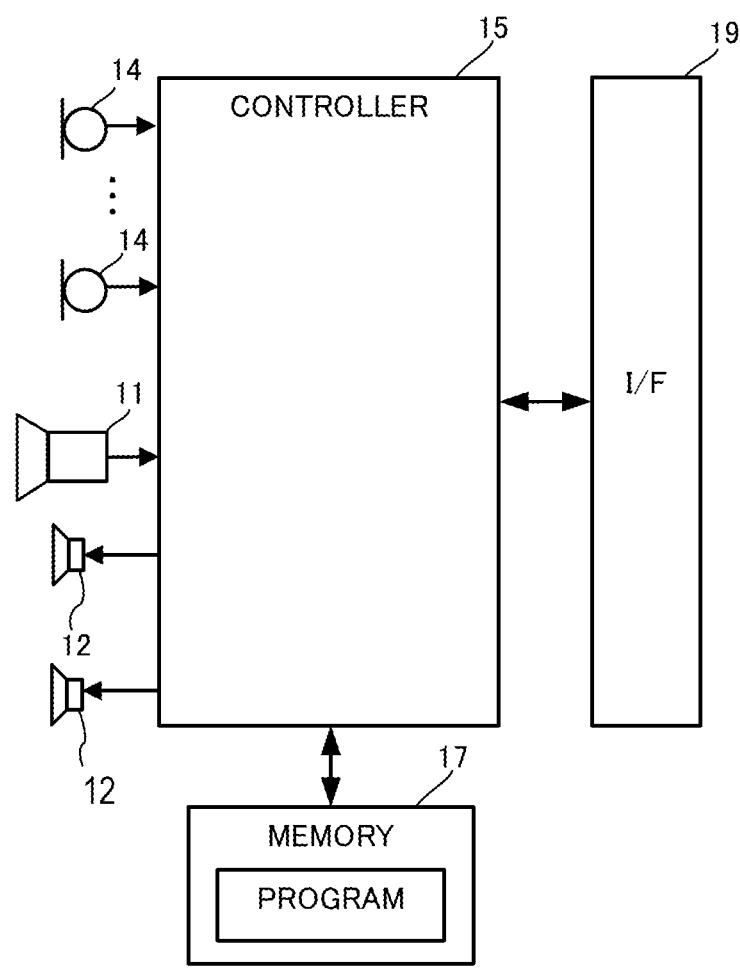
FIG. 2 is a block diagram showing a configuration of the sound collection apparatus 1.

FIG. 2 is a block diagram showing a configuration of the sound collection apparatus 1. The sound collection apparatus 1 includes the camera 11, the plurality of speakers 12, the plurality of microphones 14, a controller 15, a memory 17, and an interface (UF) 19.

The memory 17 is a storage medium storing an operating program of the controller 15. The controller 15 reads the operating program from the memory 17 and performs various operations. It is to be noted that the operating program does not have to be stored in the memory 17. For example, the operating program may be stored in a storage medium of an external apparatus such as a server. In such a case, the controller 15 may read the operating program each time from the server and may execute the operating program.

The controller 15 receives an audio signal obtained by the plurality of microphones 14. The controller 15 performs the beamforming on the audio signal obtained by the plurality of microphones 14. The beamforming is processing to form a sound collection beam with directivity toward a predetermined direction by adding and combining a delay to the audio signal obtained by the plurality of microphones 14. The sound collection beam can also form directivity that focuses on a predetermined position. The controller 15 forms the sound collection beam that focuses on a position of a speaker, for example. Two or more sound collection beams can also be formed simultaneously.

The controller 15 outputs the audio signal according to the sound collection beam to the I/F 19. The I/F 19 is a communication I/F, for example, and sends the audio signal according to the sound collection beam to an information processing apparatus such as a PC. The information processing apparatus sends the audio signal to an external apparatus (a remote place).

The information processing apparatus such as a PC receives the audio signal from the external apparatus. The controller 15 outputs the audio signal received from the I/F 19 to the plurality of speakers 12. The plurality of speakers 12 emits a sound of the audio signal received from the controller 15.

As a result, a user of the sound collection apparatus 1 can conduct an audio conference with a user at a remote place. In addition, the controller 15 may send an image captured by the camera 11 to the external apparatus (the remote place) through the information processing apparatus such as a PC. The information processing apparatus such as a PC receives the image from the external apparatus. The information processing apparatus such as a PC displays the image on the display 3. As a result, the user of the sound collection apparatus 1 can also conduct a video conference with the user at a remote place.

Figure 3:
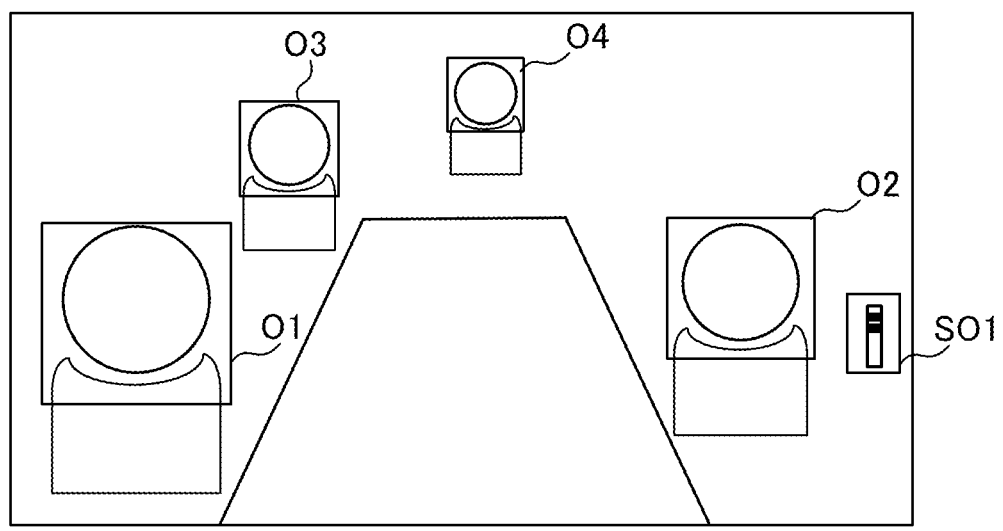
FIG. 3 is a view showing an example of an image captured by a camera 11.

The controller 15 performs processing to detect an object from the image captured by the camera 11. FIG. 3 is a view showing an example of the image captured by the camera 11. The image captured by the camera 11 may be displayed by OSD (On-Screen Display) on the display 3, for example.

The object is a substance that is recognizable from the image and includes a person, for example. The controller 15 detects a person by performing face recognition processing, for example. The face recognition processing is processing to detect a person by applying a trained model in which a relationship between a face of the person and the image captured by the camera is trained, to a predetermined model by use of a neural network or the like, for example.

In the present embodiment, an algorithm to train a model is not limited, but can use any machine training algorithm such as a CNN (Convolutional Neural Network) or an RNN (Recurrent Neural Network). The machine training algorithm may include supervised training, unsupervised training, semi-supervised training, reinforcement training, inverse reinforcement training, active training, or transfer training. In addition, the model may be trained by use of any machine training model such as HMM (Hidden Markov Model) or SVM (Support Vector Machine).

In the example of FIG. 3, the controller 15 detects four persons (O1 to O4). The controller 15 adds label information such as O1 to O4 to each of the detected persons and obtains position information in the image of each person. The position information includes two-dimensional position information. The two-dimensional position information includes X, Y coordinates (orthogonal coordinates) with the origin at a predetermined position (the lower left, for example) of the image captured by the camera 11.

In addition, the controller 15 sets a boundary box (Bounding Box) as shown by the square in FIG. 3, at a position of the detected person. The controller 15 obtains a distance to the person, based on a size of the bounding box.

For example, the memory 17 prestores a table, a function, or the like that shows a relationship between a size of a human object (the bounding box of a person) and a distance. The controller 15, by comparing the size of the human object stored in the memory 17 with a size of the human object included in the image (a size of the bounding box set by the controller 15), obtains a distance to the person.

It is to be noted that the controller 15, in a case of displaying the image captured by the camera 11 on the display 3 by the OSD, may perform image processing to make the human object stand out, by overlapping the image in the bounding box as shown in FIG. 3 with the image.

The controller 15 forms a sound collection beam that focuses on the position of the human objects O1 to O4, based on the position information. As a result, the controller 15 can obtain speech voice of the human objects O1 to O4 at a high SN ratio.

On the other hand, the controller 15 performs processing to detect a specific object from the image captured by the camera 11. The specific object is an object other than a person. In this example, the specific object is an object SO1 such as a pole as shown in FIG. 3. It is to be noted that the specific object is not limited to the object of the pole shown in FIG. 3. The specific object may include a variety of objects such as a name badge, a remote controller, a doll, or a laser pointer, for example. In addition, the specific object may be an object including a specific image (an image of a character or a two-dimensional barcode, for example) pre-registered in the memory 17. In such a case, the controller 15 detects the specific object by detecting the specific image.

Figure 4:
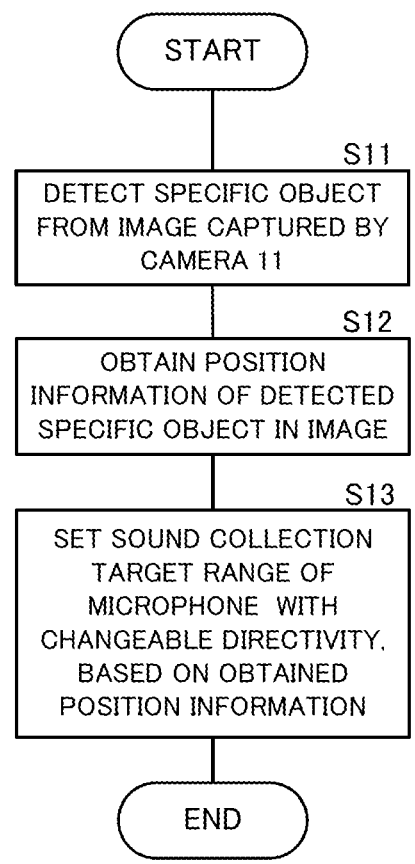
FIG. 4 is a flowchart showing an operation of a controller 15.

FIG. 4 is a flowchart showing an operation of the controller 15. The controller 15 detects the specific object by applying a trained model (a first trained model in the present disclosure) in which a relationship between the specific object and the image captured by the camera is trained, to a predetermined model by use of a neural network or the like, for example (S11). In the example of FIG. 3, the controller 15 adds the label information of SO1 to the object of the pole detected as the specific object.

Next, the controller 15 obtains a position information of the detected specific object (the object SO1 of the pole in the example of FIG. 3) in the image (S12). The position information includes the two-dimensional position information and information on the distance, as described above. The controller 15 sets a bounding box as shown by the square in FIG. 3, at a position of the detected specific object. The controller 15 obtains a distance to the specific object, based on a size of the bounding box. For example, the memory 17 prestores a table, a function, or the like that shows a relationship between a size of the specific object (a size of the bounding box) and a distance. The controller 15, by comparing the size of the specific object stored in the memory 17, a size of the specific object included in the image (a size of the bounding box set by the controller 15), and the table stored in the memory 17, obtains a distance to the specific object.

It is to be noted that the controller 15 may obtain the position of the specific object by applying a trained model (a second trained model in the present disclosure) in which a relationship between the specific object and the position of the specific object is trained, to a predetermined model by use of a neural network or the like, for example.

The controller 15 sets a sound collection target range of a microphone with changeable directivity based on the position information on the specific object (S13).

Figure 5:
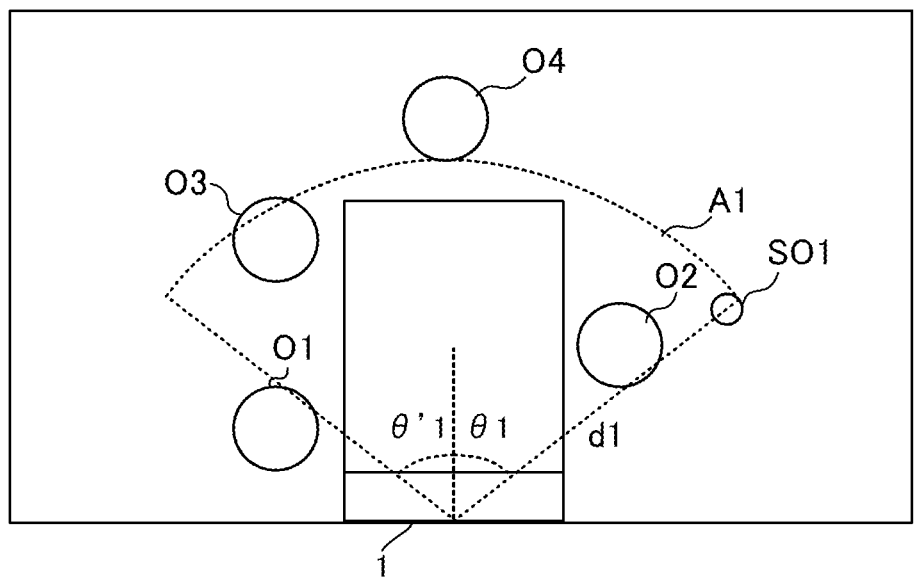
FIG. 5 is a plan view of an inside of a room corresponding to the image shown in FIG. 3.

FIG. 5 is a plan view of an inside of a room corresponding to the image shown in FIG. 3. In this example, the controller 15 sets a sound collection target range A1 with a fan shape in the plan view. The radius of the fan shape corresponds to a distance dl to the specific object SO1. In addition, an internal angle of the fan shape corresponds to a direction of the specific object SO1. For example, the controller 15, as shown in FIG. 5, sets the internal angle of the fan shape corresponding to a direction (angle $\theta'1$) symmetrical with the direction (angle $\theta 1$) of the specific object SO1 with respect to a front direction of the own apparatus (the sound collection apparatus 1).

In the example of FIG. 5, the human objects O2 and O3 are included in the sound collection target range A1. The human objects O1 and O4 are not included in the sound collection target range A1.

Therefore, the controller 15 forms a sound collection beam that focuses on the position of the human objects O2 and O3 included in the sound collection target range A1, among the human objects O1 to O4. The controller 15 does not form a sound collection beam in the position of the human objects O1 and O4 that are not included in the sound collection target range A1, among the human objects O1 to O4. Therefore, the controller 15, among the human objects O1 to O4, obtains voice of the human objects O2 and O3 included in the sound collection target range A1 and does not obtain voice of the human objects O1 and O4 that are not included in the sound collection target range A1.

As a result, the user of the sound collection apparatus 1 can easily set a sound collection target range by placing the specific object SO1 at any position and can visually recognize the sound collection target range. For example, the user of the sound collection apparatus 1, in a case of desiring to horizontally expand the sound collection target range, moves the specific object SO1 to a position horizontally away from the front of the sound collection apparatus 1. The user of the sound collection apparatus 1, in a case of desiring to horizontally narrow the sound collection target range, moves the specific object SO1 closer to the front of the sound collection apparatus 1. In addition, the user of the sound collection apparatus 1, in a case of desiring to expand the sound collection target range in the depth direction, moves the specific object SO1 away from the sound collection apparatus 1. The user of the sound collection apparatus 1, in a case of desiring to narrow the sound collection target range in the depth direction, moves the specific object SO1 closer to the sound collection apparatus 1.

Conventionally, a wall or a partition, for example, is used to divide a range in which a conference participant is present. However, the user of the sound collection apparatus 1 simply places the specific object such as a pole to divide a range in which a conference participant is virtually present also in an open space or a large conference room, and thus can obtain customer experience of easily visually recognizing the range.

Figure 6:
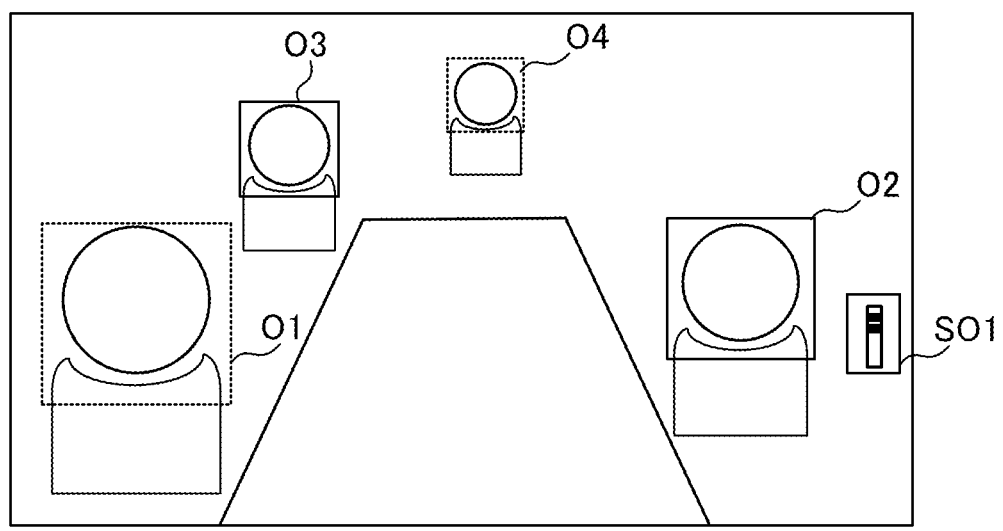
FIG. 6 is a view showing an example of an image captured by the camera 11, according to Modification 1.

Next, FIG. 6 is a view showing an example of an image captured by the camera 11, according to Modification 1. As described above, the controller 15 may display the image captured by the camera 11 by the OSD (On-Screen Display) on the display 3, for example. The controller 15 according to Modification 1 distinguishes and displays on the display 3 the sound collection target range and a range other than the sound collection target range.

As shown in FIG. 5, the human objects O2 and O3 are included in the sound collection target range A1. The human objects O1 and O4 are not included in the sound collection target range A1. Then, the controller 15 distinguishes and displays the bounding box of the human objects O2 and O3, and the bounding box of the human objects O1 and O4. In the example of FIG. 6, the controller 15 displays the bounding box of the human objects O1 and O4 by a dashed line. In addition, the controller 15 may display the sound collection target range and the range other than the sound collection target range by presence or absence of the bounding box. For example, the controller 15 may display the bounding box for a person in the sound collection target range and may not display the bounding box for any person outside the sound collection target range. Alternatively, the controller 15 may display the sound collection target range and the range other than the sound collection target range in different colors. For example, the controller 15 may display the bounding box for the person in the sound collection target range in green and may display the bounding box for the person outside the sound collection target range in red. In addition, the controller 15 may further display the bounding box of a person near a boundary of the sound collection target range and the range other than the sound collection target range, in different colors. For example, the controller 15 displays the bounding box of the person near the boundary in orange.

As a result, the user of the sound collection apparatus 1 can obtain customer experience of easily visually recognizing which person is in the sound collection target range.

Figure 7:
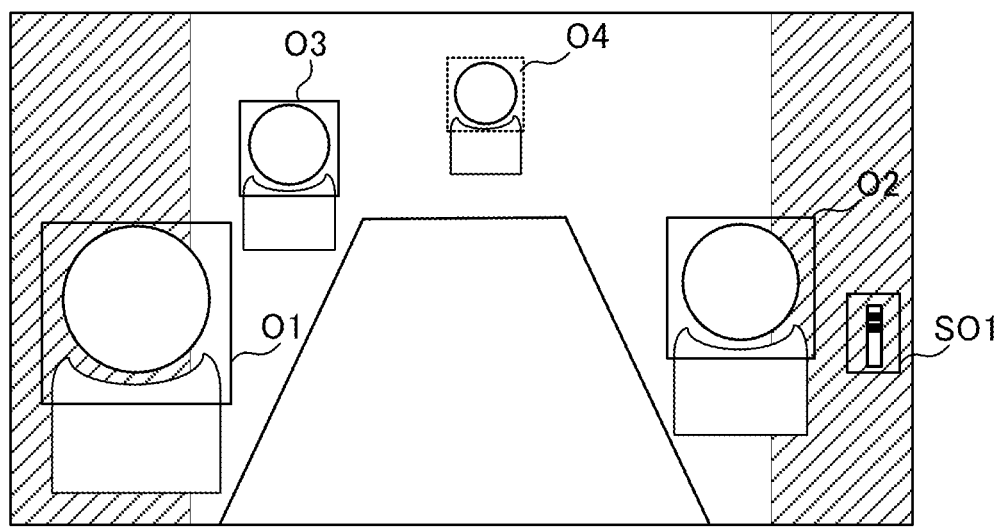
FIG. 7 is a view showing an example of an image captured by the camera 11, according to Modification 2.

FIG. 7 is a view showing an example of an image captured by the camera 11, according to Modification 2. The controller 15 according to Modification 2 also distinguishes and displays on the display 3 the sound collection target range and the range other than the sound collection target range. In the example of FIG. 7, the controller 15 displays left and right sides of the range other than the sound collection target range in grey.

As a result, the user of the sound collection apparatus 1 can obtain customer experience of easily visually recognizing the left and right sides of the range other than the sound collection target range.

Figure 8:
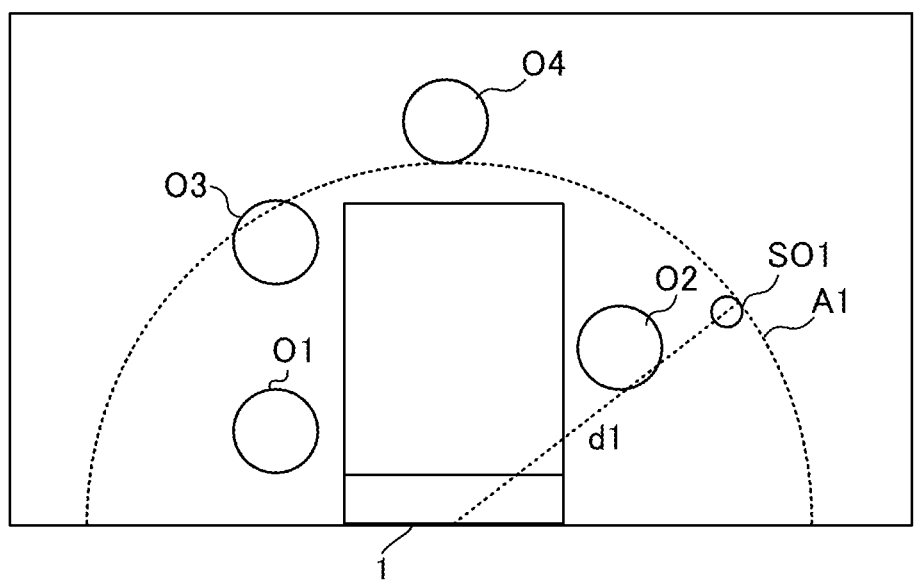
FIG. 8 is a plan view of an inside of a room, according to Modification 3.

FIG. 8 is a plan view of an inside of a room according to Modification 3. In this example, the controller 15 sets the sound collection target range A1 in the entire range in a horizontal direction. That is to say, the controller 15 sets the sound collection target range A1 with a semicircular shape in the plan view. The radius of a semicircle corresponds to the distance dl to the specific object SO1.

The user of the sound collection apparatus 1, by moving the specific object SO1 closer to or away from the sound collection apparatus 1, changes the sound collection target range A1 in the depth direction. In this case as well, the user of the sound collection apparatus 1 simply places the specific object such as a pole to divide a range in which a conference participant is virtually present also in an open space or a large conference room, and thus can obtain customer experience of easily visually recognizing the range.

Figure 9:
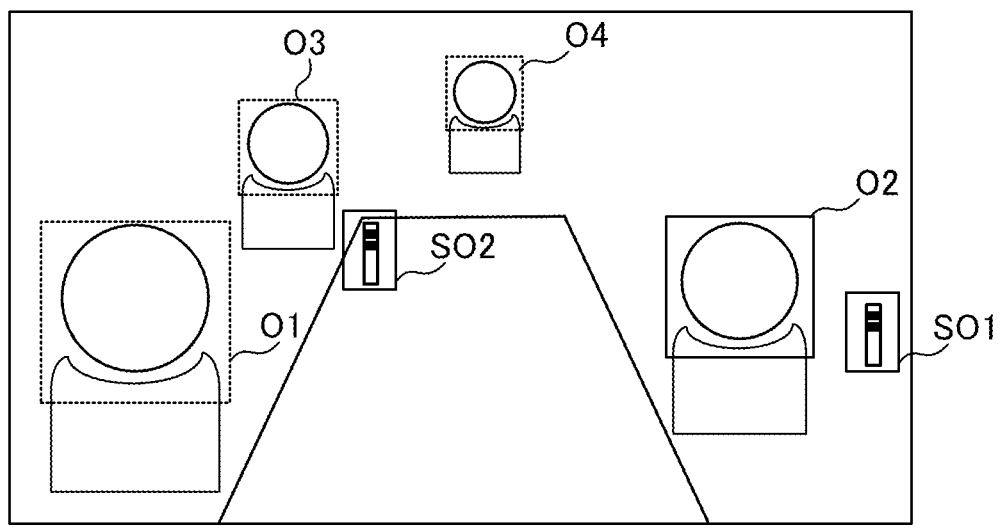
FIG. 9 is a view showing an example of an image captured by the camera 11, according to Modification 4.
Figure 10:
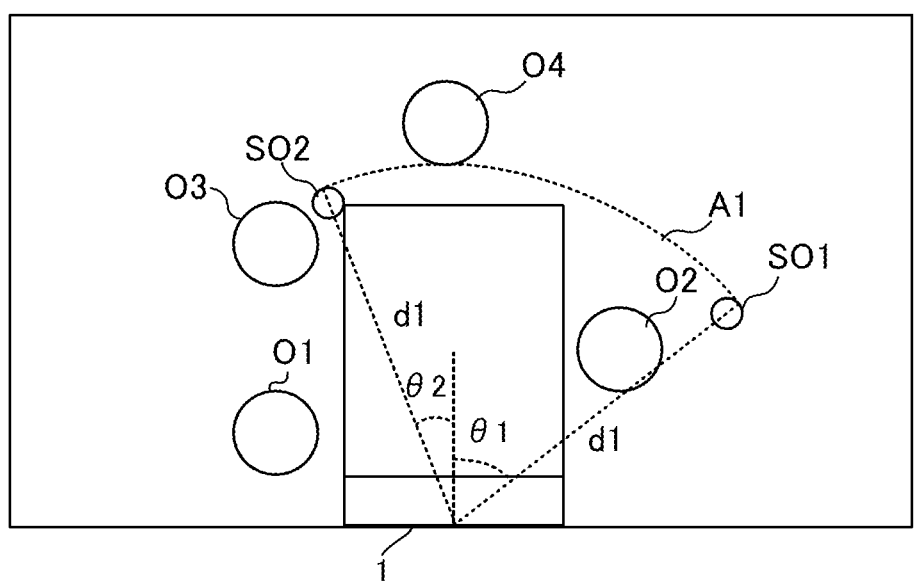
FIG. 10 is a plan view of an inside of a room according to Modification 4.

FIG. 9 is a view showing an example of an image captured by the camera 11, according to Modification 4. FIG. 10 is a plan view of an inside of a room according to Modification 4.

In Modification 4, the controller 15 detects two specific objects, the specific object SO1 and a specific object SO2, in the image. The specific object SO1 is located on the right side of the human object O2, and the specific object SO2 is located on the right side of the human object O3. The distance between the sound collection apparatus 1 and the specific object SO1 and the distance between the sound collection apparatus 1 and the specific object SO2 are the same dl.

The controller 15, as shown in FIG. 10, in the plan view, sets a fan shape from the angle θ1 in the direction of the specific object SO1 relative to the front direction of the own apparatus (the sound collection apparatus 1) to the angle θ2 in the direction of the specific object SO2, as the sound collection target range A1.

In the example of FIG. 10, only the human object O2 is included in the sound collection target range A1. The human objects O1, O3, and O4 are not included in the sound collection target range A1. Therefore, the controller 15 forms a sound collection beam that focuses on the position of the human object O2 included in the sound collection target range A1, among the human objects O1 to O4. The controller 15 does not form a sound collection beam in the position of the human objects O1, O3, and O4 that are not included in the sound collection target range A1, among the human objects O1 to O4. In addition, in the example of FIG. 9, the controller 15 displays the bounding box of the human objects O1, O3, and O4 by a dashed line.

In Modification 4, the user of the sound collection apparatus 1 places two poles and thus can obtain customer experience of more flexibly setting the sound collection target range in the horizontal direction. It is to be noted that the distance to the specific object SO1 and the specific object SO2 to the sound collection apparatus 1 does not have to be the same. The controller 15, in a case in which the distance to the specific object SO1 and the specific object SO2 to the sound collection apparatus 1 is different, may gradually change the radius of the fan shape from one specific object to the position of the other specific object.

Figure 11:
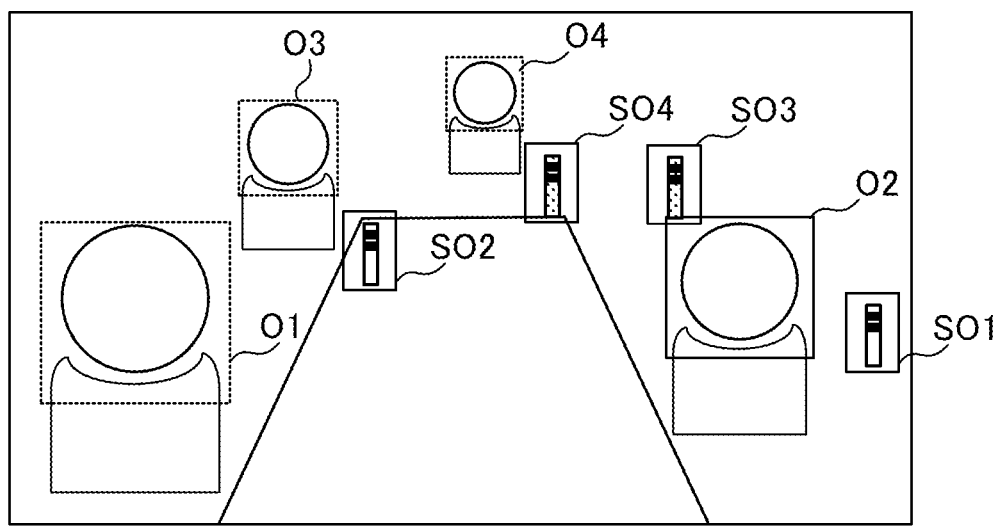
FIG. 11 is a view showing an example of an image captured by the camera 11, according to Modification 5.
Figure 12:
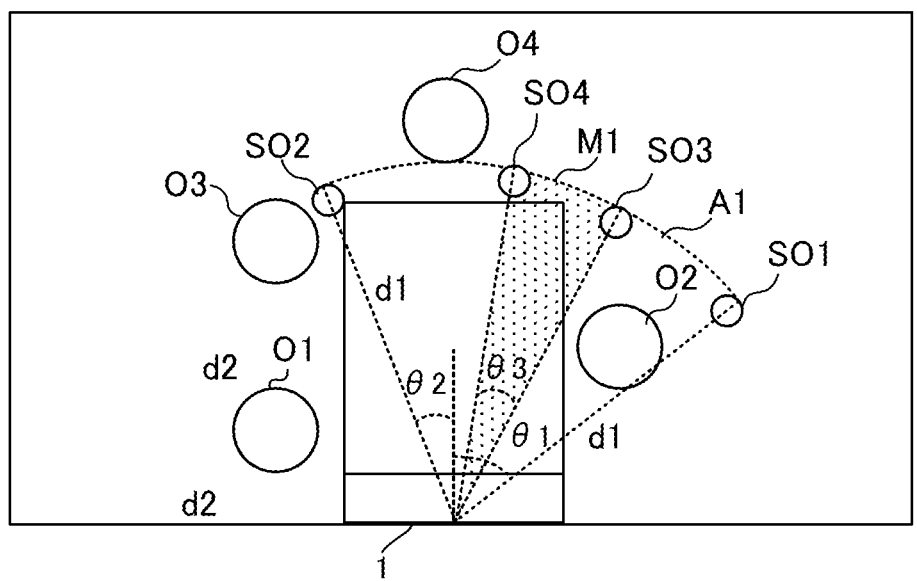
FIG. 12 is a plan view of an inside of a room, according to Modification 5.

FIG. 11 is a view showing an example of an image captured by the camera 11, according to Modification 5. FIG. 12 is a plan view of an inside of a room according to Modification 5. In Modification 5, the controller 15 further detects a specific object SO3 and a specific object SO4. The specific object SO3 is located on the left side of the human object O2, and the specific object SO4 is located on the right side of the human object O4. The distance between the sound collection apparatus 1 and the specific object SO3 and the distance between the sound collection apparatus 1 and the specific object SO4 are the same dl.

In this example, the specific object SO3 and the specific object SO4 have a different color from the specific object SO1 and the specific object SO2. The controller 15 sets a non-sound collection target range M1, based on the specific object SO3 and the specific object SO4.

For example, the controller 15, as shown in FIG. 12, in the plan view, sets the non-sound collection target range M1 with a fan shape to the angle θ3 in the direction of the specific object SO3 relative to the front direction of the own apparatus (the sound collection apparatus 1) to the direction of the specific object SO4. In such a manner, the controller 15 according to Modification 5 sets the non-sound collection target range M1 in a part of the sound collection target range A1.

In Modification 4, the user of the sound collection apparatus 1 places the specific objects SO3 and SO4 (two poles of different colors, for example), and can thus obtain customer experience of easily setting the non-sound collection target range in a part of the sound collection target range. It is to be noted that the specific object to set the non-sound collection target range is not limited to an object of a different color. The controller 15 may pre-register the appearance of the specific object to set the non-sound collection target range, in the memory 17.

Figure 13:
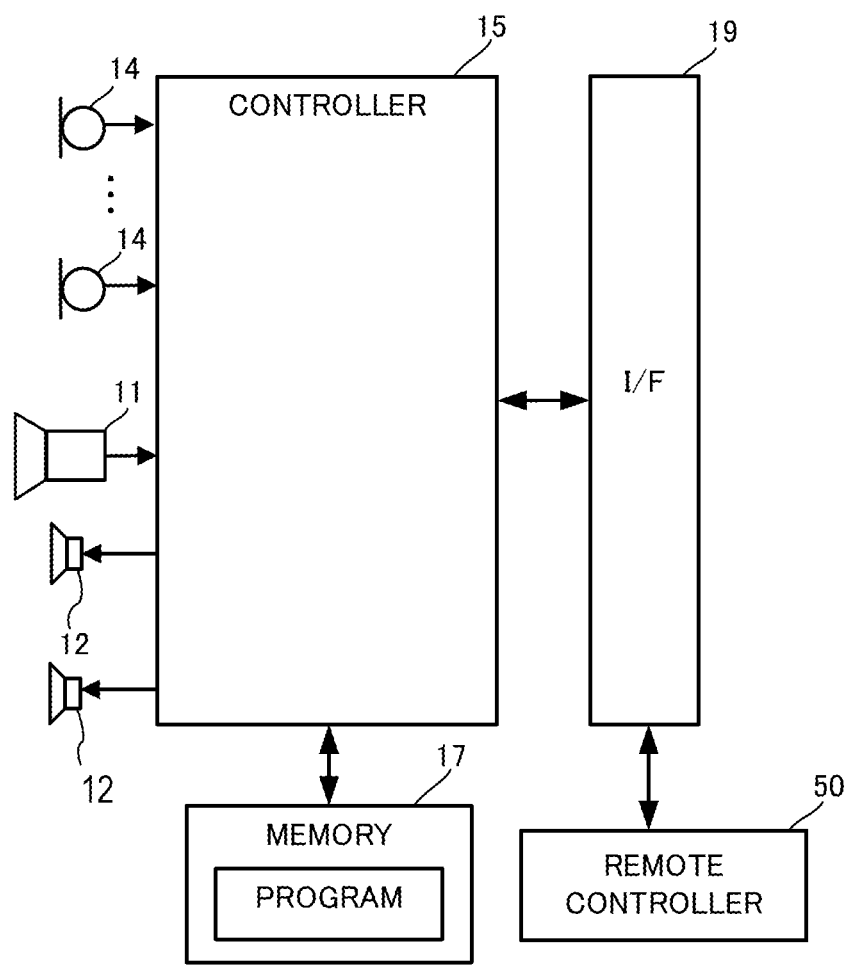
FIG. 13 is a block diagram showing a configuration of the sound collection apparatus 1, according to Modification 6.

FIG. 13 is a block diagram showing a configuration of the sound collection apparatus 1, according to Modification 6. The sound collection apparatus 1 according to Modification 6 further includes a remote controller 50. The remote controller 50 is a terminal to receive an operation from a user. The remote controller 50 is connected to the I/F 19 by means of communication such as a USB or Bluetooth (registered trademark). The remote controller 50 has a plurality of keys, for example. The plurality of keys have a power on/off key, a volume key, a direction key, or a trigger key. A user operates the direction key, for example, and performs an operation to change a capture direction of the camera 11. The remote controller 50 sends an operation signal according to the operation, to the controller 15 through the I/F 19.

The trigger key is a physical controller to receive instructions to set the sound collection target range from a user. When the user operates the trigger key, the remote controller 50 sends the operation signal according to the operation of the trigger key, to the controller 15 through the I/F 19. The controller 15, in a case of receiving the operation signal of the trigger key, sets the sound collection target range.

As a result, the user of the sound collection apparatus 1 can set the sound collection target range at any timing.

Figure 14:
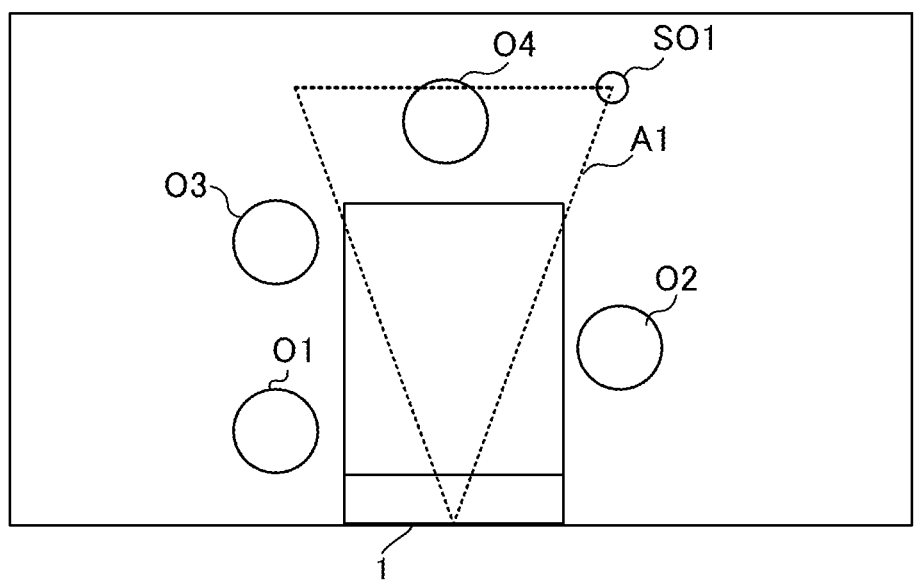
FIG. 14 is a view showing an example of a triangular sound collection target range in a plan view.

It is to be noted that the sound collection target range is not limited to a semicircular shape or a fan shape in a plan view. For example, as shown in FIG. 14, the sound collection target range may have a triangular shape in the plan view. The triangular shape has a smaller sound collection target range in the depth direction than the fan shape. For example, even with a wall surface in the depth direction, the controller 15 is difficult to obtain a reflected sound from the wall surface. Therefore, the controller 15 can obtain speech voice of a person who is present in the depth direction at a high SN ratio.

Figure 15:
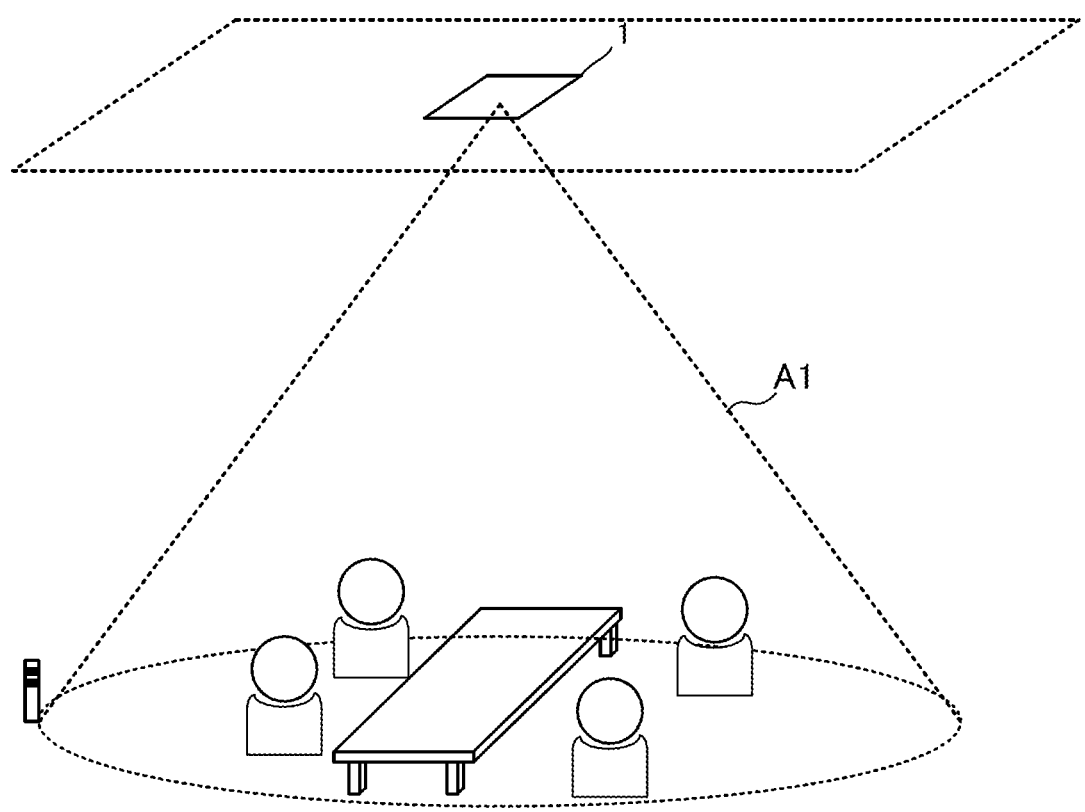
FIG. 15 is an external perspective view showing the sound collection apparatus 1 placed on a ceiling.

It is to be noted that, as shown in FIG. 15, the sound collection apparatus 1 may be placed on the ceiling, for example. In such a case, the sound collection target range may be conical, as shown in FIG. 15.

In addition, audio conferencing with a remote place by use of a speaker is not essential in the present disclosure. For example, the sound collection apparatus 1 may be a video camera. In this case as well, the user of the sound collection apparatus 1 can easily set a range from which the voice is desired to obtain and recognize the range.

The description of the foregoing embodiments is illustrative in all points and should not be construed to limit the present disclosure. The scope of the present disclosure is defined not by the foregoing embodiments but by the following claims. Further, the scope of the present disclosure is intended to include all modifications within the scopes of the claims and within the meanings and scopes of equivalents.

What is claimed is:

1. A sound collection setting method comprising:
   detecting a specific object from an image captured by a camera;
   obtaining position information of the specific object in the image;
   setting a sound collection target range of a microphone by changing directivity of the microphone, based on the position information;

storing at least one predetermined size of the specific object in a memory; and obtaining a distance to the specific object as the position information by comparing a size of the specific object included in the image with the at least one predetermined size.

2. The sound collection setting method according to claim 1, wherein:
the specific object is an object including a specific image; and
the detecting detects the specific object by detecting the specific image.

3. The sound collection setting method according to claim 1, wherein the detecting detects the specific object from the image based on a trained model that has been trained with a relationship between the specific object and the image captured by the camera.

4. A sound collection setting method comprising:
detecting a specific object from an image captured by a camera;
obtaining position information of the specific object in the image based on a trained model that has been trained with a relationship between the specific object and a position of the specific object; and
setting a sound collection target range of a microphone by changing directivity of the microphone, based on the obtained position information.

5. The sound collection setting method according to claim 1, wherein the sound collection target range is fan-shaped or triangular in a plan view, or is conical.

6. The sound collection setting method according to claim 1, further comprising setting a non-sound collection target range in part of the set sound collection target range.

7. The sound collection setting method according to claim 1, further comprising:
setting a range other than the set sound collection range; and
displaying, distinguishably on a display, the set sound collection target range and the set range other than the sound collection target range.

8. The sound collection setting method according to claim 1, wherein the setting sets the sound collection target range according to instructions to set the sound collection target range received from a user.

9. A sound collection apparatus comprising:
a camera;
a microphone configured so that directivity thereof is changeable; and
a controller configured to:
detect a specific object from an image captured by the camera;
obtain position information of the specific object in the image;
set a sound collection target range of the microphone by changing the directivity of the microphone, based on the position information;
store at least one predetermined size of the specific object in a memory; and
obtain a distance to the specific object as the position information by comparing a size of the specific object included in the image with the at least one predetermined size.

10. The sound collection apparatus according to claim 9, wherein:
the specific object is an object including a specific image; and
the controller detects the specific object by detecting the specific image.

11. The sound collection apparatus according to claim 9, wherein the controller detects the specific object from the image based on a trained model that has been trained with a relationship between the specific object and the image captured by the camera.

12. A sound collection apparatus comprising:
a camera;
a microphone configured so that directivity thereof is changeable; and
a controller configured to:
detect a specific object from an image captured by the camera;
obtain position information of the specific object in the image based on a trained model that has been trained with a relationship between the specific object and a position of the specific object; and
set a sound collection target range of the microphone by changing the directivity of the microphone, based on the obtained position information.

13. The sound collection apparatus according to claim 9, wherein the sound collection target range is fan-shaped or triangular in a plan view, or is conical.

14. The sound collection apparatus according to claim 9, wherein the controller sets a non-sound collection target range in part of the set sound collection target range.

15. The sound collection apparatus according to claim 9, further comprising:
a display,
wherein the controller:
sets a range other than the set sound collection range; and
displays, distinguishably on the display, the set sound collection target range and the set range other than the sound collection target range.

16. The sound collection apparatus according to claim 9, further comprising:
a communication interface,
wherein the controller sets the sound collection target range according to instructions to set the sound collection target range received from a user via the communication interface.

* * * * *